US008767639B2

(12) United States Patent
Zhang et al.

(10) Patent No.: US 8,767,639 B2
(45) Date of Patent: Jul. 1, 2014

(54) SYSTEMS AND METHODS FOR PROVIDING FEEDBACK IN AN ENHANCED UPLINK NETWORK

(75) Inventors: Danlu Zhang, San Diego, CA (US); Aziz Gholmieh, Del Mar, CA (US); Sharad Deepak Sambhwani, San Diego, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 12/851,398

(22) Filed: Aug. 5, 2010

(65) Prior Publication Data
US 2011/0075742 A1 Mar. 31, 2011

Related U.S. Application Data

(60) Provisional application No. 61/231,848, filed on Aug. 6, 2009, provisional application No. 61/248,785, filed on Oct. 5, 2009.

(51) Int. Cl.
*H04Q 7/00* (2006.01)
*H04W 72/04* (2009.01)

(52) U.S. Cl.
CPC .................... *H04W 72/0413* (2013.01)
USPC .............................. 370/329; 455/69

(58) Field of Classification Search
CPC .................................. H04W 72/0413
USPC ........ 370/328, 329, 335; 455/422.1, 450, 522
See application file for complete search history.

(56) References Cited

U.S. PATENT DOCUMENTS

| 2010/0113004 A1* | 5/2010 | Cave et al. | 455/422.1 |
| 2010/0118836 A1* | 5/2010 | Kazmi et al. | 370/336 |
| 2012/0142394 A1* | 6/2012 | Huan | 455/522 |
| 2012/0257591 A1* | 10/2012 | Terry et al. | 370/329 |

FOREIGN PATENT DOCUMENTS

WO WO 2009088334 7/2009

OTHER PUBLICATIONS

R2-093102, IDS, May 2009.*
Huawei: "Considerations on Happy Bit for DC-HSUPA" 3GPP Draft; R2-093153 Considerations on Happpy Bit for DC-HSUPA, 3rd Generation Partnership Project (3GPP), Mobile Competence Centre ; 650, Route Des Lucioles ; F-06921 Sophia-Antipolis Cedex ; France, No. San Francisco, USA; 20090428, Apr. 28, 2009, XP050340870.
International Search Report and Written Opinion—PCT/US2010/044799, International Search Authority—European Patent Office—Nov. 11, 2010.

(Continued)

*Primary Examiner* — Wanda Z Russell
(74) *Attorney, Agent, or Firm* — Darren M. Simon

(57) ABSTRACT

Various processing options and systems are provided for setting/controlling feedback indicators referred to as "Happy Bits" in a wireless communication network using multiple uplink carriers. In one aspect, a Happy Bit is determined independently for each one of a plurality of uplink carriers based on channel conditions and buffer lengths for the respective carrier. For example, if a UE is transmitting the maximum data allowed by its serving grant for that carrier, the UE has available power to increase the data rate on that carrier, and the TEBS delay is greater than a certain threshold, then the Happy Bit for that carrier may be set to Unhappy to inform the Node B that the UE is capable of transmitting at a higher data rate on that carrier.

62 Claims, 7 Drawing Sheets

(56) References Cited

OTHER PUBLICATIONS

Nokia et al: "On usage of happy bits in 1,2,19, dual carrier HSUPA" 30,41,52 3GPP Draft; R2-093102, 3rd Generation Partnership Project (3GPP), Mobile Competence Centre; 650, Route Des Lucioles ; F-06921 Sophia-Antipolis Cedex ; France, No. San Francisco, USA; 20090428, Apr. 28, 2009, XP050340844.

Nokia Siemens Networks: "On usage of happy bits in dual carrier HSUPA" 3GPP Draft; R2-094372, 3rd Generation Partnership Project (3GPP), Mobile Competence Centre; 650, Route Des Lucioles ; F-06921 Sophia-Antipolis Cedex ; France, No. Shenzhen, China; 20090817, Aug. 17, 2009, XP050352588.

Qualcomm Europe: "Scheduling Information and Happy Bit Feedback in DC-HSUPA" 3GPP Draft; R2-092996 DC HSUPA SI, 3rd Generation Partnership Project (3GPP), Mobile Competence Centre ; 650, Route Des Lucioles ; F-06921 Sophia-Antipolis Cedex ; France, No. San Francisco, USA; 20090428, Apr. 28, 2009, XP050340779.

Universal Mobile Telecommunications System (UMTS); Medium Access Control (MAC) protocol specification (3GPP TS 25.321 33-40, version 7.0.0 Release 7); ETSI TS 125 321 ETSI Standards, LIS, Sophia Antipolis Cedex, France, vol. 3-R2, No. V7.0.0, Mar. 1, 2006, XP014034285 ISSN: 0000-0001.

"3rd Generation Partnership Project; Technical Specification Group Radio Access Network; Medium Access Control (MAC) protocol specification (Release 7)", 3GPP TS 25.321, 3GPP, Jun. 2009, V7.13.0, p. 75, 119, 120.

\* cited by examiner

# SYSTEMS AND METHODS FOR PROVIDING FEEDBACK IN AN ENHANCED UPLINK NETWORK

CROSS-REFERENCE TO RELATED APPLICATION(S)

This application claims the benefit of U.S. Provisional Patent Application No. 61/231,848, titled "BIT FEEDBACK FOR HIGH SPEED UPLINK PACKET ACCESS" filed on Aug. 6, 2009, and U.S. Provisional Patent Application No. 61/248,785, titled "BIT FEEDBACK FOR HIGH SPEED UPLINK PACKET ACCESS", filed on Oct. 5, 2009, the disclosures of which are expressly incorporated by reference herein in their entirety.

BACKGROUND

1. Field

Aspects of the present disclosure relate generally to wireless communication systems, and more particularly, to feedback from wireless user equipment using multiple uplink carriers.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an exemplary aspect of the disclosure, a Happy Bit indicating whether user equipment will benefit from being permitted to transmit at a higher data rate than a currently permissible data rate may be determined independently for each one of a plurality of uplink carriers based on channel conditions and buffer lengths for the respective carrier. For example, if a UE is transmitting the maximum data allowed by its serving grant for that carrier, the UE has available power to increase the data rate on that carrier, and the TEBS delay is greater than a certain threshold, then the Happy Bit for that carrier may be set to Unhappy to inform the Node B that the UE is capable of transmitting at a higher data rate on that carrier. Further examples with various implementations of Happy Bits on a plurality of uplink carriers are also disclosed.

For example, in an aspect of the disclosure, a method of communication in a wireless network may include providing an indicator relating to a status of a plurality of uplink transmission resources for a respective plurality of uplink carriers on at least one of the plurality of uplink carriers.

In another aspect of the disclosure, a method of communication in a wireless network may include providing an indicator on each one of a plurality of uplink carriers, wherein the indicator on each one of the plurality of uplink carriers may consist of one bit relating to a status of uplink transmission resources on the corresponding uplink carrier.

In yet another aspect of the disclosure, an apparatus for communication in a wireless network may include means for transmitting a plurality of uplink carriers from a user equipment, and means for providing an indicator on each one of the plurality of uplink carriers, wherein the indicator on each one of the plurality of uplink carriers may consist of one bit relating to a status of uplink transmission resources on the corresponding uplink carrier.

In still another aspect of the disclosure, a computer program product may include a computer-readable medium having code for providing an indicator on each one of a plurality of uplink carriers, wherein the indicator on each one of the plurality of uplink carriers may consist of one bit relating to a status of uplink transmission resources on the corresponding uplink carrier.

In still yet another aspect of the disclosure, an apparatus for wireless communication may include at least one processor and a memory coupled to the at least one processor, wherein the at least one processor may be configured to provide an indicator on each one of a plurality of uplink carriers. Here, the indicator on each one of the plurality of uplink carriers may consist of one bit relating to a status of uplink transmission resources on the corresponding uplink carrier.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
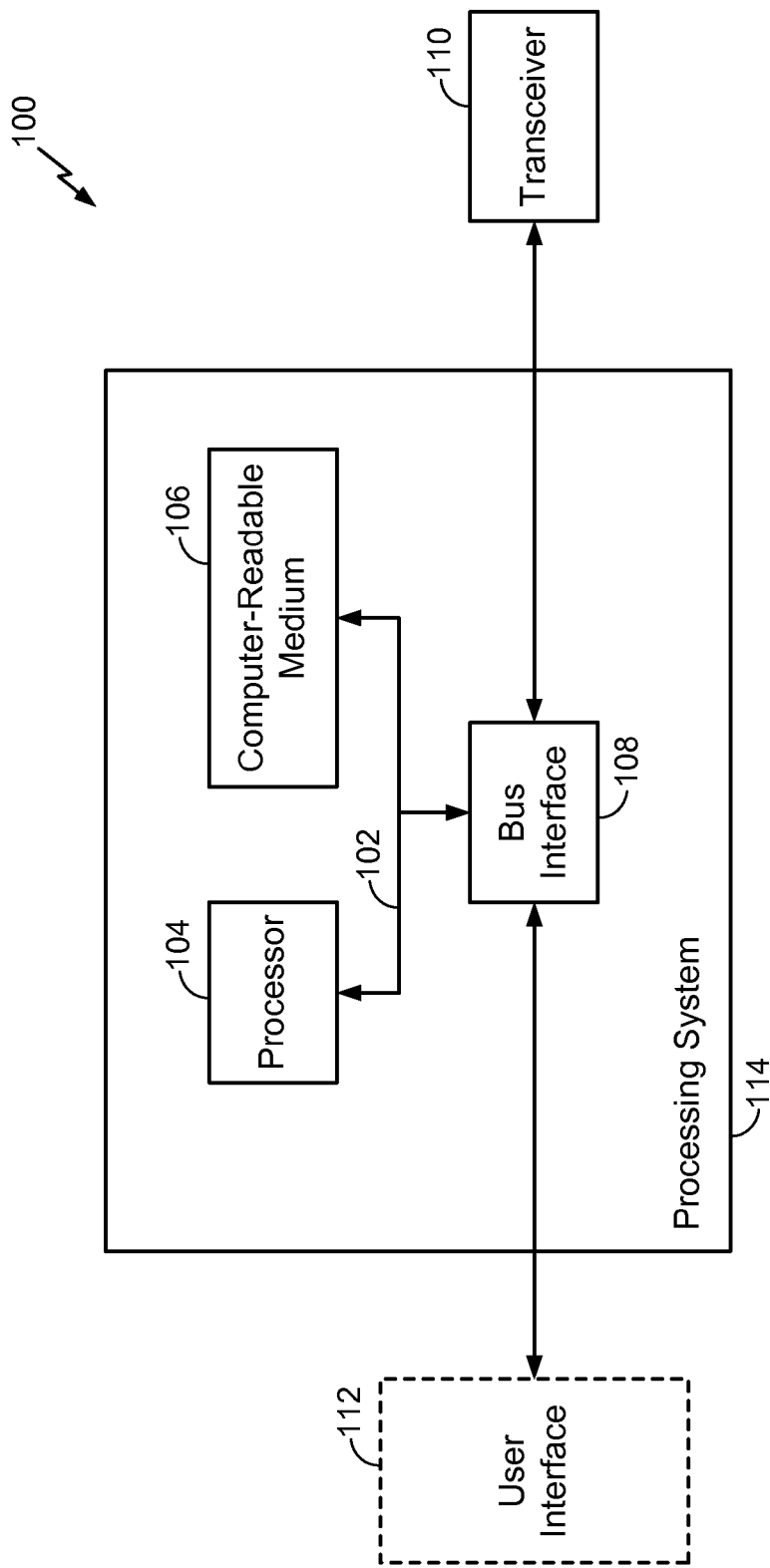
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
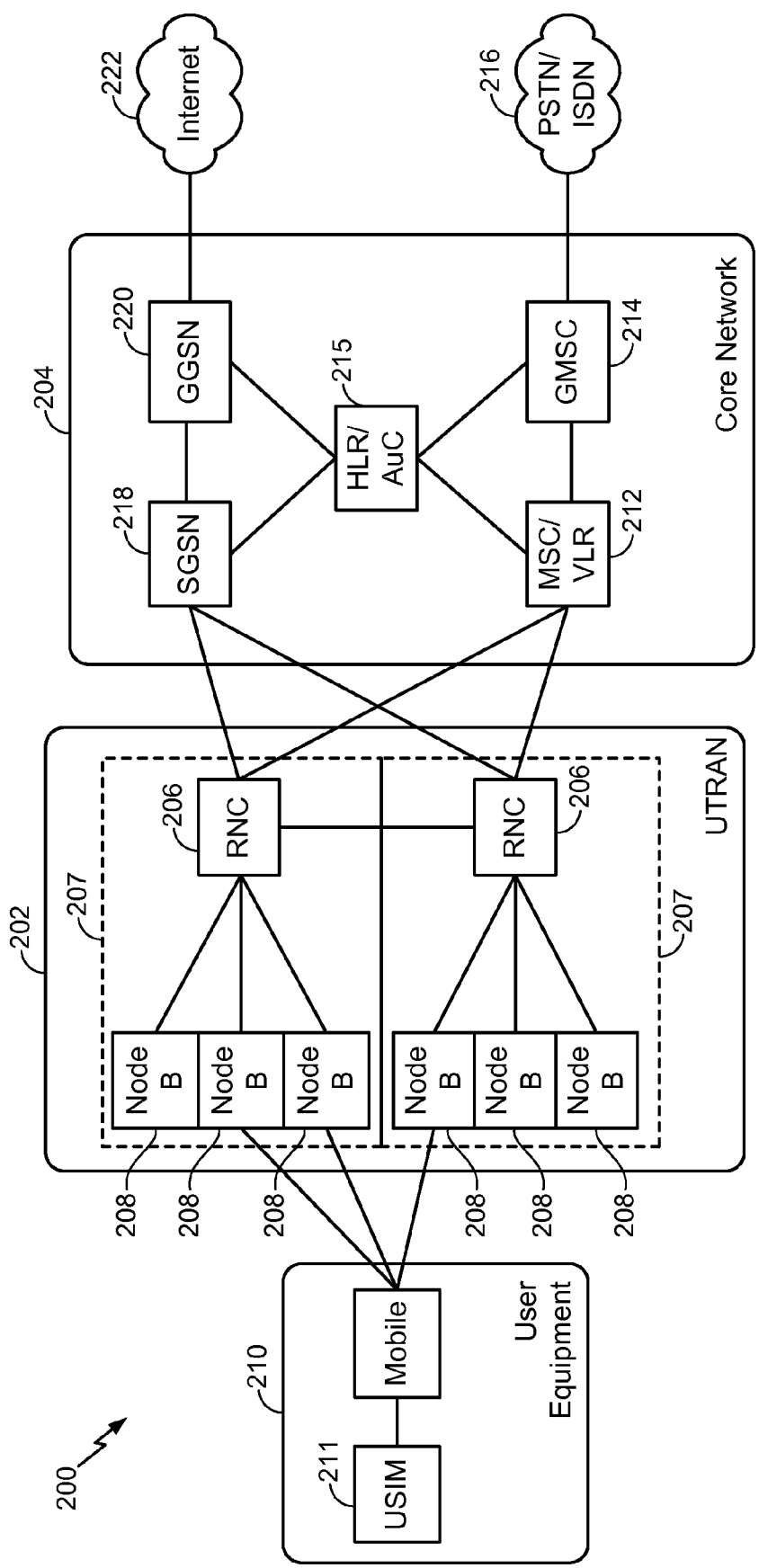
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1 (L1); the MAC layer may be considered layer 2 (L2); and the RRC layer may be considered layer 3 (L3). Information hereinbelow utilizes terminology introduced in Radio Resource Control (RRC) Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The CN domain 204 interfaces with one or more access networks, such as the UTRAN 202. As shown, the core network 204 is a GSM core network. However, as those skilled in the art will recognize, the various concepts presented throughout this disclosure may be implemented in a UTRAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard GSM circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets are transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The W-CDMA air interface is based on such direct sequence spread spectrum technology and additionally calls for a frequency division duplexing (FDD). FDD uses a different carrier frequency for the uplink (UL) and downlink (DL) between a Node B 208 and a UE 210.

Figure 3:
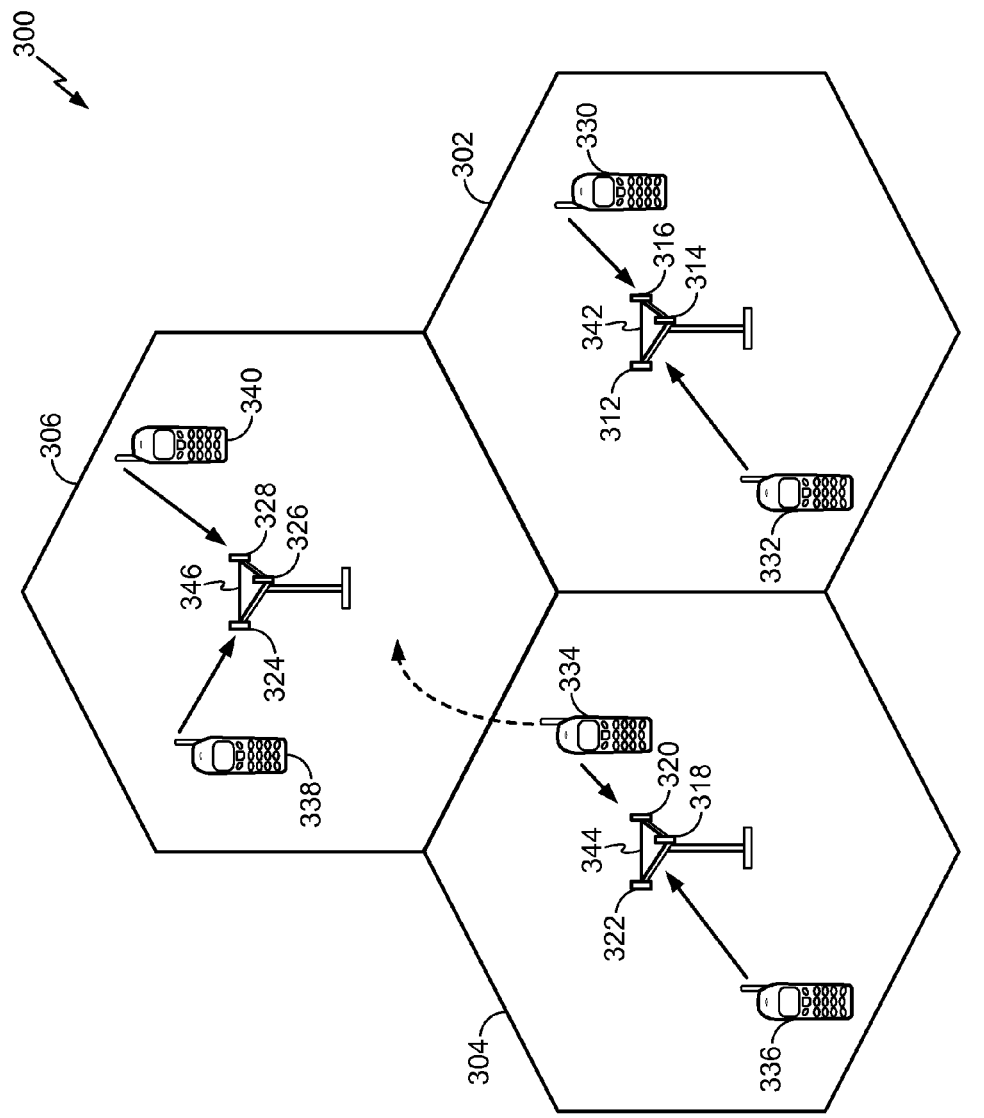
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
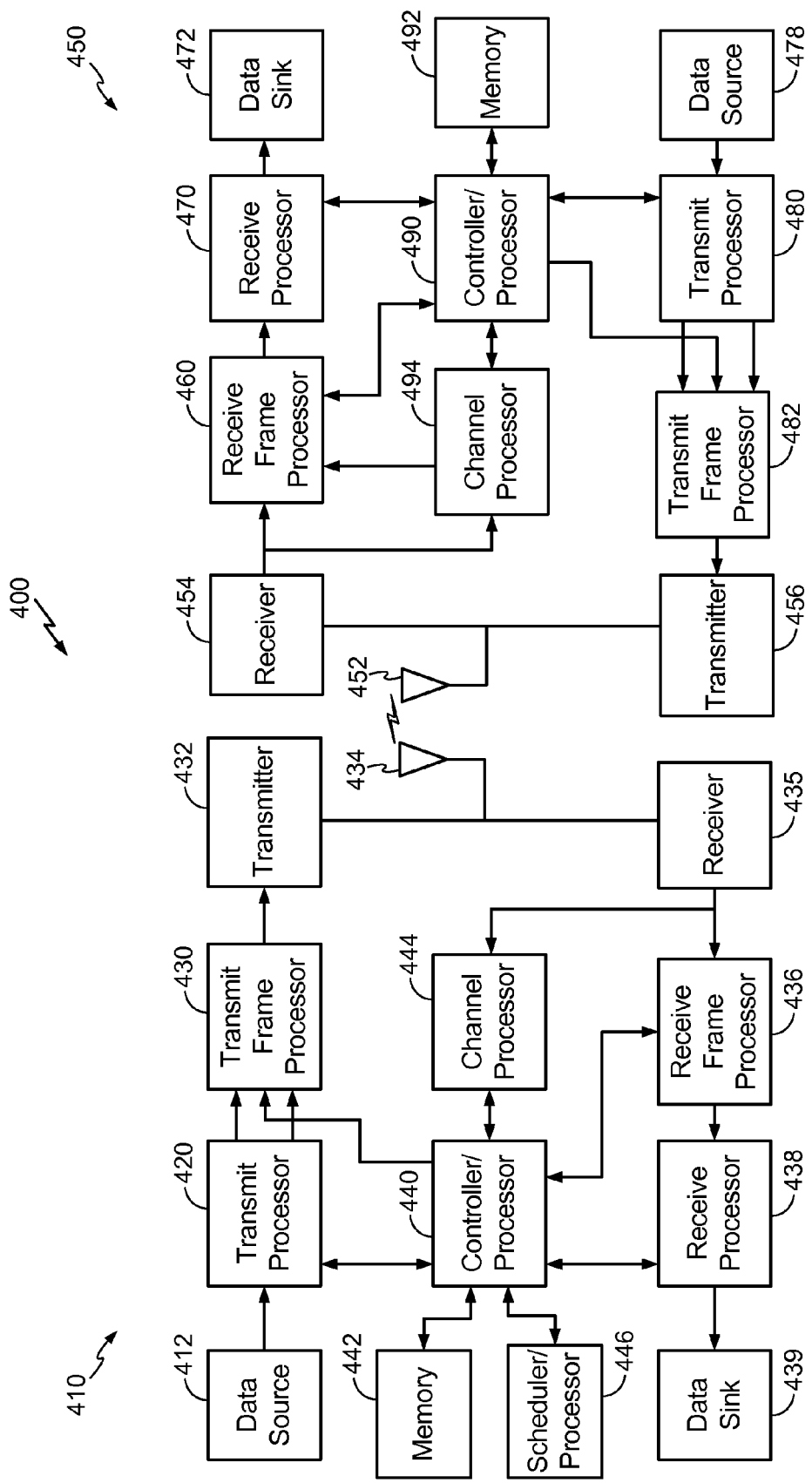
FIG. 4 is a block diagram conceptually illustrating an example of a Node B in communication with a UE in a telecommunications system.

FIG. 4 is a block diagram of a Node B 410 in communication with a UE 450 in a UTRAN 400, where the UTRAN 400 may be the UTRAN 202 in FIG. 2, the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through smart antennas 434. The smart antennas 434 may be implemented with beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback from the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Enhanced uplink (EUL), also familiar to those skilled in the art by the name of high-speed uplink packet access (HSUPA), is an enhancement to uplink communications in a UMTS system to improve the uplink data rate, responsiveness, and link adaptation. HSUPA uses an uplink transport channel called the EUL dedicated channel (E-DCH). The E-DCH may be mapped onto one or more E-DCH dedicated physical data channels (E-DPDCH), having an associated E-DCH dedicated physical control channel (E-DPCCH). Here, the one or more E-DPDCHs may be used to carry uplink data for the E-DCH transport channel. The E-DPCCH may carry control information used for the decoding of the payload carried on the associated E-DPDCH, as well as feedback from the UE to the Node B, for example, to indicate whether the UE has adequate resources. At least a portion of this feedback is frequently referred to as a "Happy Bit," and may be used to support scheduling decisions at the Node B. Broadly speaking, the Happy Bit is used by the UE to indicate to the Node B whether the granted data rate is satisfactory to the UE, or whether the UE would benefit from being permitted by the Node B to utilize more resources. Further information about the Happy Bit is provided below.

The physical layer generally multiplexes one or several transport channels onto a coded composite transport channel. These transport channels each have defined transport formats, which may be from a transport format set. However, at a given time, not all combinations of transport channels and their associated formats may be permitted, and thus, transport format subsets may be defined in accordance with certain conditions. The transport format combination (TFC) is one of these subsets, identifying the transport channels with their chosen format that make up the coded composite transport channel. The enhanced TFC (E-TFC) may be utilized to select a data rate for the enhanced uplink physical channels (e.g., E-DPCCH and E-DPDCH).

E-TFC selection is a procedure invoked by a HARQ entity, and defined in section 11.8.1.4 of the 3GPP TS 25.321 release 9 specification, incorporated herein by reference. According to the E-TFC selection procedure, for each MAC-d flow, the RRC configures the MAC with a power offset for "Control-only" transmissions. This power offset is used in a HARQ profile for "Control-only" transmissions, which may be used in a case that the Scheduling Information needs to be transmitted without any higher-layer data. Here, a HARQ profile may include a power offset attribute and maximum number of HARQ transmissions. Furthermore, during the E-TFC selection procedure for a UE that utilizes more than one uplink carrier, a determination of a power allocation or split between the uplink carriers is made. That is, the power allocation to a frequency i, $P_i$ is calculated as:

$$P_i = P_{remaining,s} \frac{P_{DPCCH,target,i} SG_i}{\sum_k P_{DPCCH,target,k} SG_k},$$

where $P_{remaining,s}$ is the remaining power for scheduled transmissions once the power for non-scheduled transmissions has been taken into account, $P_{DPCCH,target,i}$ is a filtered DPCCH power, and $SG_i$ is the Serving Grant on frequency i. Here, for the anchor carrier, the maximum remaining power allowed for E-DCH transmission may be the sum of the total power pre-allocated for all the non-empty non-scheduled MAC-d flows and the power $P_i$ allocated to the anchor carrier. For the secondary carrier, the maximum remaining power allowed for E-DCH transmission may be the power $P_i$ for this frequency.

In HSUPA, an uplink scheduler at a Node B may dynamically allocate power among the UEs for each transmission time interval (TTI). The allocation of power to a respective UE (i.e., the serving grant) effectively determines the data rate at which the UE may transmit. That is, the serving grant relates to a permissible rate of data transmission for a particular UE. Certain systems may define a state variable called Serving_Grant. In a frequency-division duplexing (FDD) system, the state variable Serving_Grant indicates the maximum E-DPDCH to DPCCH power ratio that the UE is permitted to use for scheduled data in the following transmission. The value in the appropriate state variable may be provided to the E-TFC selection function to help in selecting the best format for the upcoming transmission. Possible values may include "Zero_Grant" and numerical values.

To determine a serving grant, the uplink scheduler uses feedback information from the UE related to the channel conditions and buffer lengths. For example, a Scheduling Information (SI) message is a L2 message from a UE to serve this purpose. The SI message may include fields for the total E-DCH buffer status (TEBS) that identify the total amount of data available across all logical channels for which reporting has been requested by the radio resource control (RRC). The SI may further identify the highest priority logical channel with available data (HLID), and the highest priority logical channel with available data buffer status (HLBS). Furthermore, the SI may include UE power headroom (UPH) information indicating the ratio of the maximum UE transmission power and the corresponding DPCCH code power.

However, the SI message may only be sent about once every 100 ms. In between SI messages, the Happy Bit may be used for the UE to indicate changes in its buffer lengths and/or channel conditions. The Happy Bit is generally included on the E-DPCCH for every E-DCH transmission. Here, the UE may use the Happy Bit to inform the serving Node B that the resources allocated to it are not sufficient, and/or that it is capable of transmitting at a higher data rate, for example. The RRC configures the MAC with the duration Happy_Bit_Delay_Condition, over which to evaluate the current serving grant relative to the TEBS after application of the E-TFC selection procedure described above.

Dual-cell or dual-carrier HSUPA (DC-HSUPA) is a further evolution of HSUPA that utilizes carrier aggregation in the uplink. That is, in DC-HSUPA, the UE transmits dual E-DCHs utilizing frequency division multiplexing. Here, one E-DCH is transmitted on what is referred to as a primary or anchor carrier, and a second E-DCH is transmitted on a secondary carrier. The anchor carrier is the carrier where the serving E-DCH cell is identical to the serving HS-DSCH cell. The association between a pair of uplink and downlink frequencies may be determined by higher layers.

Further enhancements to HSUPA may include any number of uplink carriers even greater than two, further exploiting the benefits of carrier aggregation. Various aspects of the present disclosure may be applicable to multi-carrier HSUPA, which generally includes any version of HSUPA with more than one uplink carrier, including but not limited to DC-HSUPA.

During multi-carrier operation, such as in DC-HSUPA, the UE may share its total transmission power over a plurality of carriers. Further, in controlling uplink power, respective DPCCH power levels from the UE may be different for each carrier. Thus, according to an exemplary aspect of the disclosure, a serving Node B may allocate a serving grant for a UE for each individual carrier, so that interference is reduced or minimized at the Node B. A higher serving grant may be allocated to a carrier on which the DPCCH power level is lower, potentially leading to a lesser increase in interference at the Node B. To this end, it may be desirable for the Node B to know on which carrier the DPCCH power level is actually lower. The UE power headroom (UPH) reports in the SI messages provided by the UE may provide information about the DPCCH power level, but the UPH is generally a delayed average value of a ratio between the maximum UE power and the used DPCCH power, where the averaging window may be 100 ms, and a maximum delay to report the estimate of the average value may be 10 ms. Thus, via the UPH report, it may be difficult to get TTI-level information about DPCCH power levels of the UE at the Node B. Furthermore, when the UPH on the two carriers is substantially different, it is possible for the UE to be 'happy' on one carrier while 'unhappy' on the other.

Thus, in an exemplary HSUPA system in accordance with an aspect of the disclosure with a plurality of uplink carriers, such as DC-HSUPA, there may be a Happy Bit on each of the plurality of carriers. With a plurality of Happy Bits, the Node B may determine which of a plurality of carriers has the better or best UPH in between the SI reports. Thus, depending on how the respective happy bits are chosen (e.g., if a single determination of "happiness" is made and the same Happy Bit is transmitted on both carriers), there may be some level of redundancy when sending the Happy Bit on each of the plurality of carriers. Therefore, multiple options exist in determining how to set these Happy Bits.

Responsive to the state of the Happy Bit provided by the UE, the Node B scheduler may perform a fast update of a Serving Grant. In addition, in a case where the cell is heavily loaded, according to different scheduling strategies, a "happy" UE may be downgraded first for the purpose of load control. The E-AGCH/E-RGCH are carrier-specific; that is to say, each carrier may maintain an independent Serving Grant. Thus, it can be of benefit for the Node B scheduler to know whether a UE is happy for each carrier.

Various processing options and systems are discussed below for setting or controlling Happy Bits in a multi-carrier HSUPA process. In an exemplary aspect of the disclosure, each of the plurality of carriers transmits the same Happy Bit value. In another exemplary aspect of the disclosure, the Happy Bit on the anchor carrier follows a similar rule to that in a legacy single-carrier system, whereas the Happy Bit on secondary carrier (or carriers) is reserved for other feedback. This way, redundancy in the determination of how to set the two happy bits may be reduced or eliminated. Furthermore, the possibility of new feedback information not otherwise available is provided. In yet another aspect of the disclosure, the Happy Bit may be determined independently on each of the carriers. This way, more information on the channel conditions of each carrier may be provided.

In order to reduce the complexity of algorithms used in both the UE and the network, in accordance with an exemplary aspect of the disclosure, the "unhappy" or "happy" decision for Happy Bits for a plurality of carriers may be combined. That is, the UE may return one common value on each of a plurality of carriers: "unhappy" or "happy," where this indication is determined according to a combined status of each of the carriers.

Here, for each E-DCH transmission, the Happy Bit on each of the plurality of carriers may be set to "unhappy" when each of the following three criteria are true, and to "happy" when any of the following three criteria are untrue. First, the UE is transmitting as much scheduled data as permitted by the current Serving_Grant in E-TFC selection on each carrier (e.g., the anchor carrier and the secondary carrier in a DC-HSUPA example). Second, the UE has sufficient transmission resources, such as power, available to transmit at a higher data rate in at least one of the carriers. Third, based on the same power offset as the ones selected in the E-TFC selection to transmit data in the same TTI as the Happy Bit, TEBS would require a delay of more than Happy_Bit_Delay_Condition ms to be transmitted with the (current Serving_Grant in the primary carrier+current Serving_Grant in the secondary carrier)×the ratio of active processes to the total number of processes.

Here, the first criterion (the UE transmitting the maximum allowed data) is generally true for a deactivated process, and the ratio (active processes/total number of processes) of the third criterion is always 1 for a 10 ms TTI.

The second criterion refers to a sufficiency of transmission resources, such as a power. Here, a UE may have a finite amount of transmission resources available to allocate between the plurality of uplink carriers. For example, a limited amount of power may be available from a battery or power supply, and a portion of this power for transmission may be divided between each of the plurality of uplink carriers. The division of power between the uplink carriers may be equal, or it may be unequal. In one example, the split of transmission resources between the plurality of uplink carriers or may be dynamically controlled in accordance with one or more criteria. Here, in order to determine whether the UE has sufficient power available to transmit at a higher data rate on at least one of the carriers, the UE may use the following procedure.

First, if the MAC-i/is configured, identify an E-TFC that has a transport block size at least 32 bits larger than the transport block size of the E-TFC selected for transmission in the same TTI as the Happy Bit. Otherwise (i.e., if the MAC-i/is not configured), identify the E-TFC that has a transport block size at least x bits larger than the transport block size of the E-TFC selected for transmission in the same TTI as the Happy Bit, where x is the smallest RLC PDU size configured among all the logical channels that do not belong to non-scheduled MAC-d flows and which have data in the buffer.

Second, based on the same power offset as the one selected in E-TFC selection to transmit data in the same TTI as the Happy Bit, check that the identified E-TFC is supported, i.e., not blocked. If each identified E-TFC is blocked, then the UE lacks sufficient power to transmit at a higher data rate on at least one of the carriers. Here, in order to determine whether an E-TFC is supportable on a carrier, the split or allocation of power between the plurality of carriers for that E-TFC should be defined and calculated. However, a power split between the carriers is already calculated during the standard E-TFC selection procedure, as described above. The same power split may be reused here to check that the identified E-TFC is supported. An advantage of reusing the same split as that determined in E-TFC selection is that the Happy Bit determined utilizing the same power split will reflect the actual E-TFC selected given the new Serving Grant, which may be granted in accordance with the current Happy Bit. Because the output of the power split during E-TFC selection provides the 'supported' and 'blocked' state of each E-TFC of each MAC-d flow, this state may be used by the Happy Bit determination procedure.

According to another exemplary aspect of the disclosure, a decision of a "happy" or "unhappy" state, determined according to a combined status of each of the carriers, is used for setting the Happy Bit on one of the carriers, such as the anchor carrier, and the Happy Bit on another one or more of the carriers, such as the secondary carrier or carriers, may be used for other feedback. In one example utilizing DC-HSUPA, the Happy Bit on the secondary carrier may be used to indicate the desire to keep or de-activate the secondary uplink. That is, for an E-DCH transmission, the Happy Bit on the anchor carrier may be set to "unhappy" when each of the following three criteria are determined to be true, and set to "happy" when any of the following three criteria is untrue. First, the UE is transmitting as much scheduled data as allowed by the current Serving_Grant in the E-TFC selection on both carriers. Second, the UE has enough transmission resources, such as power, available to transmit at a higher data rate on at least one of the carriers. Third, based on the same power offset as the one selected in the E-TFC selection to transmit data in the same TTI as the Happy Bit, TEBS would employ more than Happy_Bit_Delay_Condition ms to be transmitted with the current (Total_Serving_Grant×the ratio of active processes to the total number of processes), where Total_Serving_Grant is the sum of the Serving_Grant on both carriers.

Here, the first criterion (the UE transmitting the maximum allowed data) is generally true for a deactivated process, and the ratio (active processes/total number of processes) of the third criterion is always 1 for a 10 ms TTI.

For the second criterion, in order to determine whether the UE has sufficient power available to transmit at higher data rate on at least one of the carriers, the UE may use the following procedure.

First, if the MAC-i/is configured, identify the E-TFC that has a transport block size at least 32 bits larger than the transport block size of the E-TFC selected for transmission in the same TTI as the Happy Bit. Otherwise (i.e., if the MAC-i/is not configured), identify the E-TFC that has a transport block size at least x bits larger than the transport block size of the E-TFC selected for transmission in the same TTI as the Happy Bit, where x is the smallest RLC PDU size configured among all the logical channels that do not belong to non-scheduled MAC-d flows and which have data in the buffer.

Second, based on the same power offset as the one selected in E-TFC selection to transmit data in the same TTI as the Happy Bit, check that the identified E-TFC is supported, i.e., not blocked. For example, in order to determine whether an E-TFC is supportable on a carrier, the split or partitioning of power between the plurality of carriers should be defined and calculated. A power split between the carriers is calculated during the standard E-TFC selection procedure, described above. The same power split may be used here. An advantage of reusing the same split as that determined in E-TFC selection is that Happy Bit determined utilizing the same power split will reflect the actual E-TFC selected given the new Serving Grant, which reacts to the current Happy Bit. Because the output of the power split during E-TFC selection provides the 'supported' and 'blocked' state of each E-TFC of each MAC-d flow, this state may be used by the Happy Bit determination procedure.

Here, as discussed above, the Happy Bit on the secondary carrier may be used to indicate the desire to keep or de-activate the secondary uplink. Due to the extra overhead associated with the secondary uplink, although SI feedback alone might be too slow for this purpose, a fast UE to Node B feedback may utilize the Happy Bit on the secondary uplink carrier for dynamic secondary carrier deactivation when the UE does not have enough headroom to justify the secondary uplink carrier. Here, the setting of the Happy Bit on the secondary carrier may be based on changes in the channel conditions. The Happy Bit on the secondary carrier may be used either as an implicit indication of a release of the secondary carrier by the UE, or as a request for the Node B to do so through HS-SCCH orders.

Those skilled in the art will recognize from the above discussion that, for the first criterion (whether the UE is transmitting the maximum allowed data), the UE may determine whether it is satisfied with the current serving grant independently on each carrier since there is one serving grant per carrier. Further, for the second criterion (whether the UE has available power), where a decision is independently made for each carrier, the criterion might be fulfilled for each of the two carriers while the total power could exceed the maximum UE transmission power. Moreover, for the third criterion (delay to provide TEBS), because there may be one joint MAC buffer across two carriers, in order to evaluate the remaining time needed for the transmission of the data currently in the buffer, it should be considered whether the transmission capability of the two carriers should be considered together.

From the UE point of view, it may be desirable to keep the determination of the Happy Bits on each of the carriers as independent as possible to reduce the complexity of implementation as well as the impact to the previous versions of the 3GPP standards.

Thus, according to another exemplary aspect of the disclosure, a plurality of independent Happy Bits may be employed. That is, the Happy Bit may be included on the E-DPCCH for every E-DCH transmission on each activated uplink frequency. However, E-DCH transmissions are generally not triggered specifically to allow the transmission of the happy bit. In an example with two activated uplink frequencies (i.e., DC-HSUPA), one independent Happy Bit is included on each of the anchor carrier and the secondary carrier, and changes in the channel conditions on both carriers may be provided as feedback to the Node B.

Here, for every E-DCH transmission on each activated uplink frequency, the Happy Bit on the respective carrier may be set to "unhappy" when each of the following three criteria are determined to be true, and set to "happy" when any of the following three criteria is untrue. First, the UE is transmitting as much scheduled data as allowed by the current Serving_Grant in the E-TFC selection on the respective carrier. Second, the UE has sufficient transmission resources, such as power, available to transmit at higher data rate on the respective carrier. Third, based on the same power offset as the one selected in E-TFC selection to transmit data in the same TTI as the Happy Bit, TEBS would employ more than Happy_Bit_Delay_Condition ms to be transmitted with the current (Serving_Grant×the ratio of active processes to the total number of processes), where the Serving_Grant corresponds to the respective carrier.

In an alternate embodiment, the third criterion given above may be changed such that the delay in finishing TEBS is calculated by combining the Serving Grants and active HARQ interlaces on each of the plurality of carriers. That is, in an example using two carriers (i.e., a DC-HSUPA system), the third criterion in accordance with this aspect of the disclosure may be that, based on the same power offset as the one selected in E-TFC selection to transmit data in the same TTI as the Happy Bit, TEBS would require more than Happy_Bit_Delay_Condition ms to be transmitted with the current (Serving_Grant×the ratio of active processes to the total number of processes on the anchor uplink carrier) plus (Serving_Grant× the ratio of active processes to the total number of processes on the secondary uplink carrier).

The first criterion (the UE transmitting the maximum allowed data) is generally true for a deactivated process, and the ratio of the third criterion (active processes/total number of processes) is always 1 for a 10 ms TTI.

For the second criterion, in order to determine whether the UE has enough transmission resources, such as power, available to transmit at a higher data rate on a respective one of the carriers (as per the second criterion discussed above), the UE may use the following procedure.

First, if the MAC-i/is configured, identify the E-TFC that has a transport block size at least 32 bits larger than the transport block size of the E-TFC selected for transmission in the same TTI as the Happy Bit. Otherwise (i.e., if the MAC-i/is not configured), identify the E-TFC that has a transport block size at least x bits larger than the transport block size of the E-TFC selected for transmission in the same TTI as the Happy Bit, where x is the smallest RLC PDU size configured among all the logical channels that do not belong to non-scheduled MAC-d flows and which have data in the buffer.

Second, based on the same power offset as the one selected in the E-TFC selection to transmit data in the same TTI as the Happy Bit, check that the identified E-TFC is supported, i.e., not blocked. Here, the blocking condition for the higher payload on each carrier may be evaluated against the power allocated to that carrier based on whatever power split was determined in the E-TFC selection, discussed above. If each suitable E-TFC having the transport block size described above is not supported, or blocked, as indicated by the E-TFC state, then the UE lacks sufficient power to transmit at the higher data rate on the respective carrier.

The portion of power allocated to each of the uplink carriers assumed in the above calculation could be fixed to other values or made dynamic as long as the portion can be inferred by the Node B.

In accordance with another aspect of the disclosure, the UE may request a higher grant, or may be "happy," for a subset of the plurality of carriers, e.g., one or more carriers. Further, when the UE has data in its buffers to send and has spare power, it may request higher grants for a carrier on which the DPCCH power level is lower. It should also be possible to request more grants for more than one of the plurality of carriers at the same time, e.g., when the DPCCH levels are within a suitable margin (e.g., where the DPCCH power levels are quite close to each other). In Table 1, the meaning of the Happy Bits in accordance with one example of this aspect of the disclosure using a dual-carrier DC-HSUPA system is illustrated. In this table, the received Happy Bits are illustrated as a two-bit binary number, where the most significant bit, on the left, represents the Happy Bit feedback on carrier 1, and the least significant bit, on the right, represents the Happy Bit feedback on carrier 0. Here, either one of carriers 0 or 1 may be the Anchor carrier or the Secondary carrier in various examples.

TABLE 1

| Received Happy Bits | Meaning |
| --- | --- |
| 00 | No need for increase on either carrier |
| 01 | UE requesting increased allocation, carrier 1 better carrier |
| 10 | UE requesting increased allocation, carrier 0 better carrier |
| 11 | UE requesting increased allocation to both carriers |

An alternative interpretation may be used if there is a suitable limit for a maximum difference in total power between the carriers. Table 2 illustrates the meaning of the Happy Bits in accordance with one example of this aspect of the disclosure.

TABLE 2

| Received Happy Bits | Meaning |
| --- | --- |
| 00 | No need for increase on either carrier |
| 01 | UE requesting increased allocation, carrier 1 lower power |
| 10 | UE requesting increased allocation, carrier 0 lower power |
| 11 | UE requesting increased allocation to both carriers |

That is, according to an aspect of the disclosure, the indication 10 may be used if the UE has more data to send and spare power available, but the TX power difference between carrier 0 and carrier 1 is at some specified limit and the data rate may not be increased on carrier 1 without violating this TX power difference limit. Code 01 may be used where carrier 0 has higher power and may not be increased any further without violating the TX power difference limit. Code 11 may indicate that the allocation may be increased on either or carrier without violating the limit.

In accordance with another aspect of the disclosure, the UE may request a higher or lower grant for one carrier at a time using combined happy bit information. Similarly, here, the UE may request higher grants to a carrier on which the DPCCH power level is lower. Here, a Happy Bit on one carrier may indicate that the UE has power/data available for a higher grant, and a Happy Bit on the other carrier may indicate which carrier is preferable for a higher grant. Note that even though the UE may not request more resources, it can still indicate to the Node B which carrier is the preferable carrier. For example, if the Node B starts to decrease resource allocation of the UE, it may reduce the first grant on the less preferable carrier of the UE. Thus, this option provides the UE a way to indicate (when transmitting on the E-DPCCH) to the Node B about priorities of carriers from the UE's point of view. In Table 3, the meaning of happy bits is illustrated in accordance with one example of this aspect of the disclosure.

TABLE 3

| Received happy bits | Meaning |
| --- | --- |
| 00 | No need for increase on either carrier, Carrier 0 is the better carrier |
| 01 | No need for increase on either carrier, Carrier 1 is the better carrier |
| 10 | UE requesting increased allocation, Carrier 0 is the better carrier |
| 11 | UE requesting increased allocation, Carrier 1 is the better carrier |

A potential drawback of this example is in situations where the UE uses only one carrier for the transmission in dual carrier mode. Here, a UE fallback mechanism may be desired.

Figure 5:
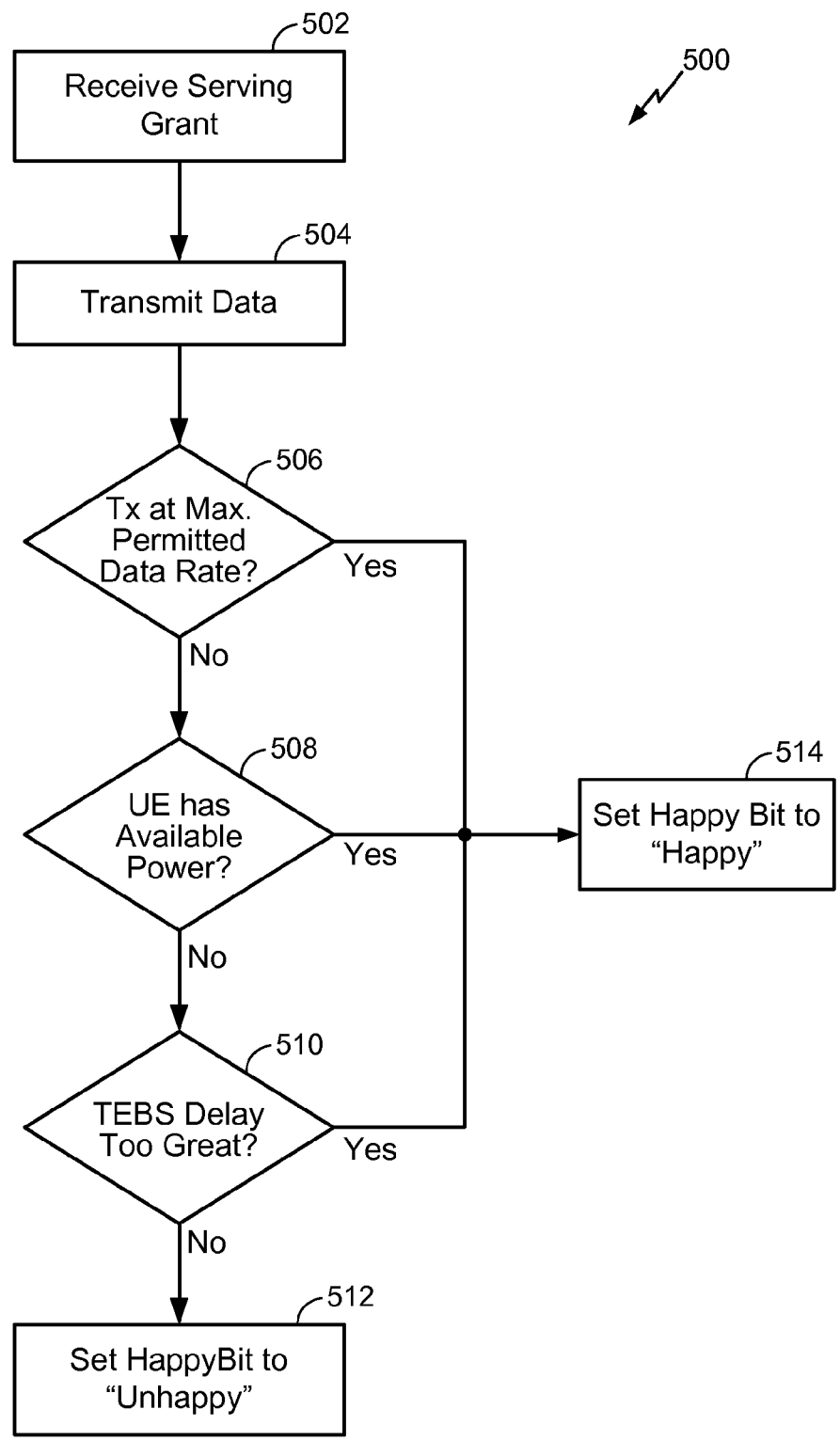
FIG. 5 is a flow chart conceptually illustrating an exemplary process for independently determining a respective Happy Bit for each of a plurality of uplink carriers.

FIG. 5 is a flow chart illustrating an exemplary process 500 in accordance with various aspects of the instant disclosure. In the illustrated process, the Happy Bit is an example of a one-bit indicator that may be provided on one or more of a plurality of uplink carriers relating to a status of uplink transmission resources for the one or more carriers. As discussed above, the status of the uplink transmission resources may be dynamically allocated between the plurality of uplink carriers, as long as the allocation of resources corresponds to a supported E-TFC. In the exemplary process illustrated, the process steps may be executed for a single Happy Bit corresponding to a single uplink carrier independently, or the process steps may be executed for a single Happy Bit corresponding to a combined status of a plurality of uplink carriers.

In block 502, the process receives (e.g., at a UE 450, see FIG. 4) a serving grant from a respective Node B (e.g., Node B 410, see FIG. 4) corresponding to an allocation of resources for the UE to utilize on uplink transmissions. In some examples, a respective serving grant may be received for each of a plurality of uplink carriers to be provided by the UE. In block 504, the process transmits data on the respective plurality of uplink carriers.

In blocks 506-510, the process determines the status of the plurality of uplink transmission resources by determining whether the UE will benefit from being permitted to transmit at a data rate higher than a currently permissible data rate (e.g., corresponding at least in part to the serving grant) on at least one of the plurality of uplink carriers. That is, blocks 506-510 may make a determination as to whether the UE will benefit being permitted to transmit at the higher data rate than the permissible data rate based on channel conditions of the uplink carriers, and/or respective buffer lengths for data to be transmitted on the respective carriers.

Specifically, in block 506, the process determines whether the UE is transmitting at the highest permissible data rate. For example, the process may determine whether the UE is transmitting as much scheduled data as allowed by the current Serving_Grant in the E-TFC selection on one or more of the carriers. If the UE is already transmitting as much scheduled data as permitted by the current Serving_Grant in the corresponding E-TFC selection, the UE would not benefit from being permitted to transmit at a higher data rate, so the Happy Bit is set to Happy in block 514.

In block 508, the process may determine whether the UE has sufficient power available to increase to the higher data rate on one or more of the uplink carriers. Here, the determination of whether the UE has sufficient power may include identifying an E-TFC that has a transport block size greater than a suitable threshold in accordance with configuration of the MAC layer, and determining whether that identified E-TFC is supported or blocked. If each suitable E-TFC is blocked, then the UE lacks the power to increase to the higher data rate, and thus, the UE would not benefit from being permitted to transmit at the higher data rate. Therefore, the Happy Bit is set to Happy in block 514.

In block 510, the process may determine whether a TEBS delay corresponding to one or more of the uplink carriers is greater than a suitable threshold. If the TEBS delay corresponding to the higher data rate is too great, the UE would not benefit from being permitted to transmit at the higher data rate, so the Happy Bit is set to Happy in block 514.

If each of the criteria in blocks 506-510 is untrue, then the UE would benefit from being permitted to transmit at the higher data rate, so the Happy Bit is set to Unhappy in block 512. In this way, the UE provides feedback to a Node B to improve the allocation of resources on the uplink.

Figure 6:
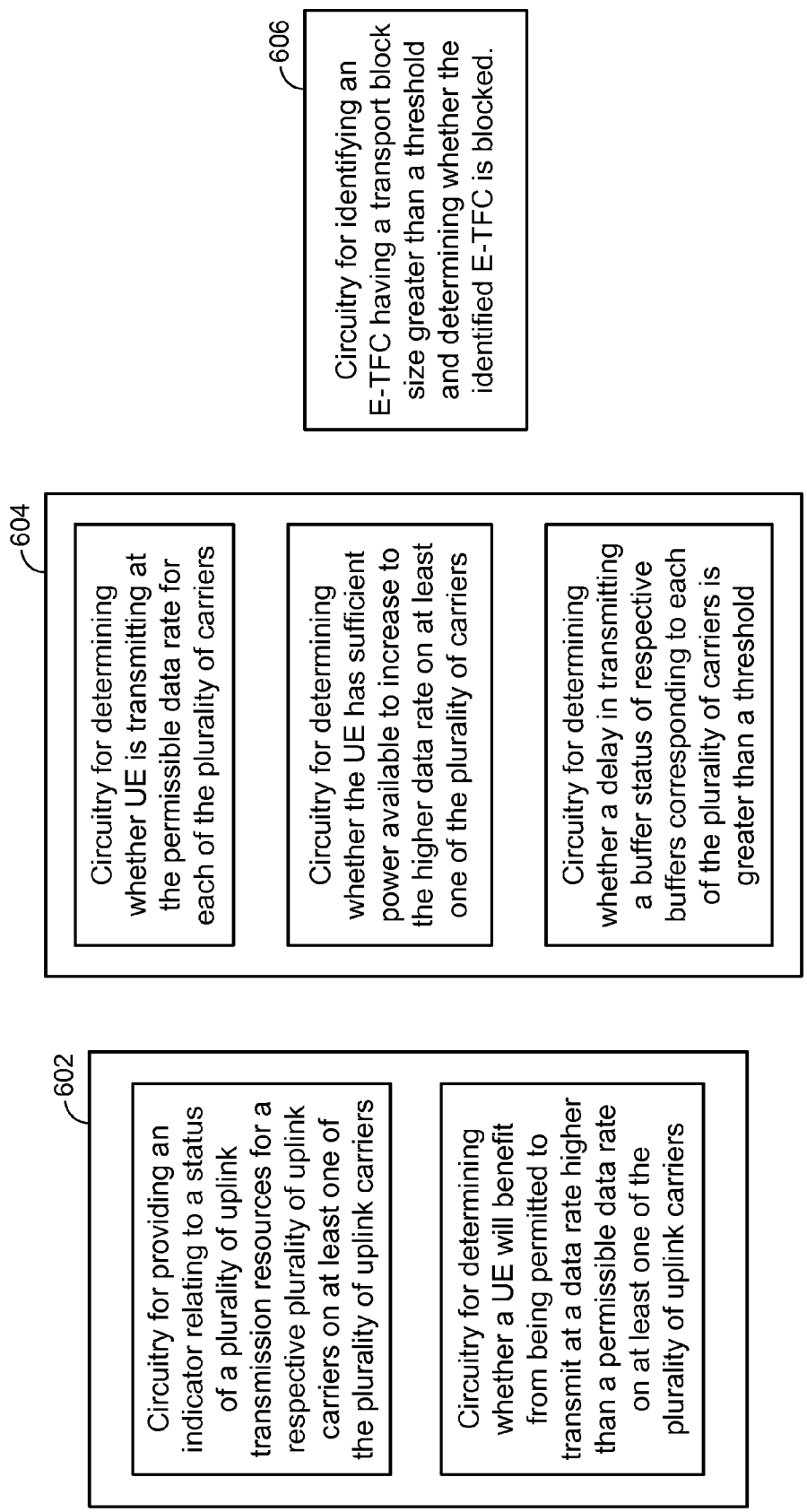
FIGS. 6 and 7 are a conceptual block diagrams illustrating apparatus having circuitry for performing certain functions in accordance with various exemplary aspects of the disclosure.
Figure 7:
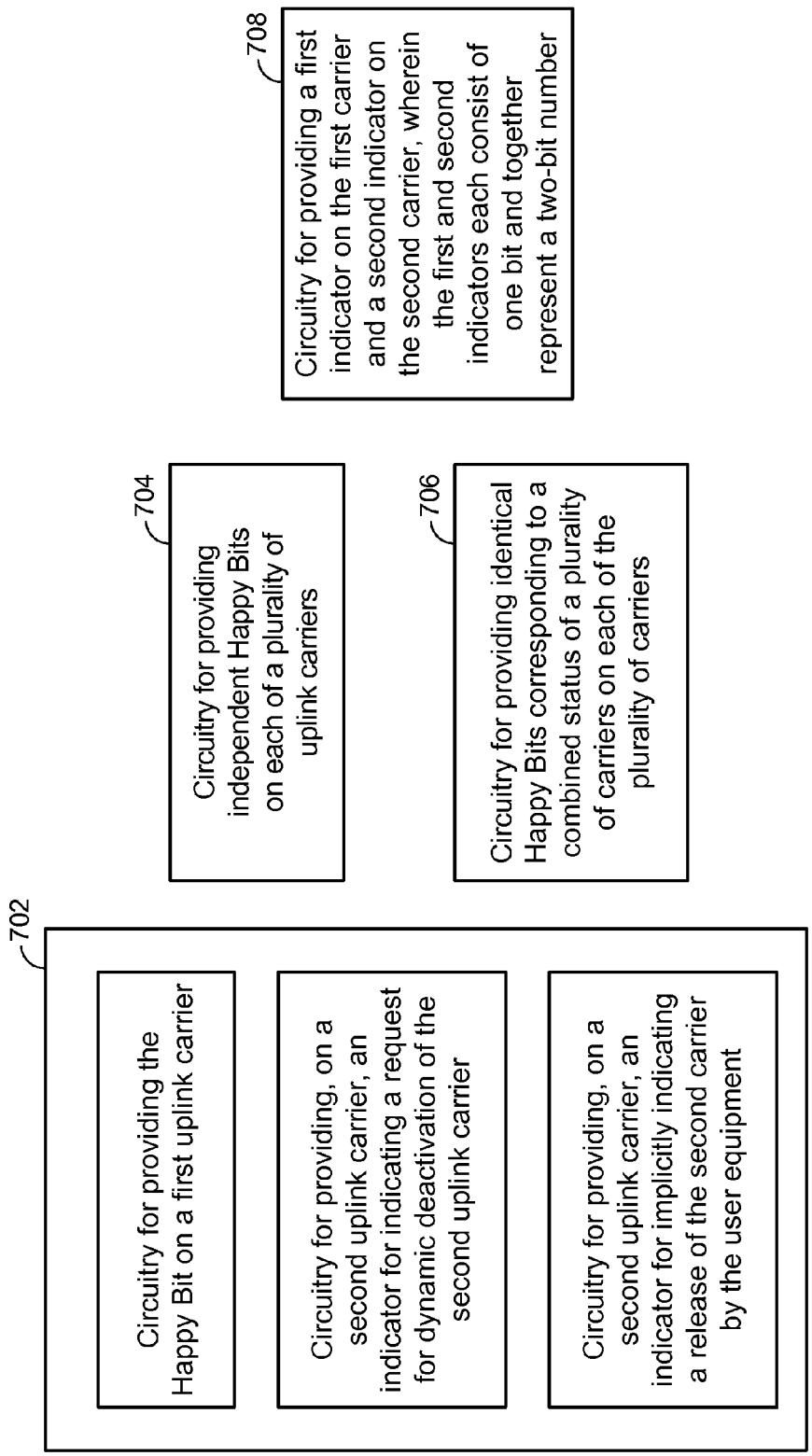

FIGS. 6 and 7 are a conceptual block diagrams illustrating apparatus having circuitry for performing certain functions in accordance with various exemplary aspects of the disclosure. According to various aspects of the disclosure, a particular embodiment may include any one or more of the blocks illustrated in FIGS. 6 and 7, and the inclusion of one block or sub-block does not necessarily mean any additional block is included in a particular embodiment. Block 602 includes circuitry for providing an indicator relating to a status of a plurality of uplink transmission resources for a respective plurality of uplink carriers on at least one of the plurality of uplink carriers and circuitry for determining whether a UE will benefit from being permitted to transmit at a data rate higher than a permissible data rate on at least one of the plurality of uplink carriers.

Block 604 includes circuitry for determining whether UE is transmitting at the permissible data rate for each of the plurality of carriers, circuitry for determining whether the UE has sufficient power available to increase to the higher data rate on at least one of the plurality of carriers, and circuitry for determining whether a delay in transmitting a buffer status of respective buffers corresponding to each of the plurality of carriers is greater than a threshold.

Block 606 includes circuitry for identifying an E-TFC having a transport block size greater than a threshold and determining whether the identified E-TFC is blocked.

Block 702 includes circuitry for providing the Happy Bit on a first uplink carrier, circuitry for providing, on a second uplink carrier, an indicator for indicating a request for dynamic deactivation of the second uplink carrier, and circuitry for providing, on a second uplink carrier, an indicator for implicitly indicating a release of the second carrier by the user equipment. Block 704 includes circuitry for providing independent Happy Bits on each of a plurality of uplink carriers. Block 706 includes circuitry for providing identical Happy Bits corresponding to a combined status of a plurality of carriers on each of the plurality of carriers. Block 708 includes circuitry for providing a first indicator on the first carrier and a second indicator on the second carrier, wherein the first and second indicators each consist of one bit and together represent a two-bit number.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using computer software, various electrical components such as electronic hardware, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

In one or more aspects of the disclosure, the functions described may be implemented in hardware, software, firmware, or any combination thereof. If implemented in software, the functions may be stored on or transmitted over as one or more instructions or code on a computer-readable medium. Computer-readable media may include both computer storage media and communication media including any medium that facilitates transfer of a computer program from one place to another. Storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are entities included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Computer-readable media may be embodied in a computer-program product. By way of example, but without limitation, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication in a wireless network, comprising:
provideng an indicator relating to a status of a plurality of uplink transmission resources for a respective plurality of uplink carriers on at least one of the plurality of uplink carriers, wherein a value for the indicator is set based on a power split between the plurality of uplink carriers determined during an enhanced transport format combination (E-TFC) selection procedure, wherein the power split between the plurality of uplink carriers is reused to determine whether at least one of the carriers can support a higher data rate.

2. The method of claim 1, wherein the indicator consists of one bit on each of at least one of the plurality of uplink carriers.

3. The method of claim 2, wherein the indicator is provided during each transmission on a dedicated uplink channel for each of the at least one of the plurality of uplink carriers.

4. The method of claim 1, wherein the uplink transmission resources are dynamically allocated between the plurality of uplink carriers.

5. The method of claim 1, further comprising:
determining the status of the plurality of uplink transmission resources by determining whether a user equipment configured to provide the plurality of uplink carriers will benefit from being permitted to transmit at a data rate higher than a permissible data rate on at least one of the plurality of uplink carriers.

6. The method of claim 5,
wherein the determining whether the user equipment will benefit from being permitted to transmit at a higher data rate than the permissible data rate on at least one of the plurality of uplink carriers is based on at least one of channel conditions of the plurality of uplink carriers or respective buffer lengths for data to be transmitted on respective ones of the plurality of carriers.

7. The method of claim 6, wherein the permissible data rate for each of the plurality of uplink carriers is determined at least in part in accordance with a respective serving grant for each of the plurality of uplink carriers.

8. The method of claim 7, wherein the determining whether the user equipment will benefit from being permitted to transmit at a higher data rate than the permissible data rate comprises:
determining whether the user equipment is transmitting at the permissible data rate for each of the plurality of carriers;
determining whether the user equipment has sufficient power available to increase to the higher data rate on at least one of the plurality of carriers; and
determining whether a delay in transmitting a buffer status of respective buffers corresponding to each of the plurality of carriers is greater than a threshold.

9. The method of claim 8, wherein the determining whether the user equipment has sufficient power available to increase to the higher data rate on at least one of the carriers comprises:
identifying a transport format combination comprising a transport block size greater than a threshold; and
determining whether the identified transport format combination is blocked.

10. The method of claim 9, wherein the determining whether the identified transport format combination is blocked comprises utilizing a power offset corresponding to the identified transport format combination selected in an E-TFC selection procedure.

11. The method of claim 9, wherein the determining whether the identified transport format combination is blocked comprises utilizing the power split determined during an E-TFC selection procedure.

12. The method of claim 6, wherein the plurality of uplink carriers comprises a first carrier and a second carrier,
wherein the indicator relating to the status of the plurality of uplink transmission resources for the respective plurality of uplink carriers is provided on a first carrier, and
wherein the second carrier does not include the indicator relating to the status of the plurality of uplink transmission resources for the respective plurality of uplink carriers.

13. The method of claim 12, wherein, in the place of the indicator relating to the status of the plurality of uplink transmission resources for the respective plurality of uplink carriers on the second carrier, the second carrier comprises an indicator for indicating a request for dynamic deactivation of the second uplink carrier.

14. The method of claim 12, wherein, in the place of the indicator relating to the status of the plurality of uplink transmission resources for the respective plurality of uplink carriers on the second carrier, the second carrier comprises an indicator for implicitly indicating a release of the second carrier by the user equipment.

15. The method of claim 6, wherein the plurality of uplink carriers comprises a first carrier and a second carrier, and
wherein the providing of the indicator relating to the status of the plurality of uplink transmission resources for the respective plurality of uplink carriers on the at least one of the plurality of uplink carriers comprises providing a first indicator on the first carrier and a second indicator on the second carrier, wherein the first and second indicators each consist of one bit and together represent a two-bit number.

16. The method of claim 15, wherein the two-bit number has a first value corresponding to an indication that the UE will not benefit from being permitted to transmit at a data rate higher than the permissible data rate on either of the two uplink carriers, a second value corresponding to an indication that the UE will benefit from being permitted to transmit at a data rate higher than the permissible data rate, and an increased data rate on the first carrier is requested, a third value corresponding to an indication that the UE will benefit from being permitted to transmit at a data rate higher than the permissible data rate, and an increased data rate on the second carrier is requested, and a fourth value corresponding to an indication that the UE will benefit from being permitted to transmit at a data rate higher than the permissible data rate, and an increased data rate on both of the two carriers is requested.

17. The method of claim 15, wherein the two-bit number has a first value corresponding to an indication that the UE will not benefit from being permitted to transmit at a data rate higher than the permissible data rate on either of the two uplink carriers, a second value corresponding to an indication that the UE will benefit from being permitted to transmit at a data rate higher than the permissible data rate, and the first carrier is currently utilizing less power than the second carrier, a third value corresponding to an indication that the UE will benefit from being permitted to transmit at a data rate higher than the permissible data rate, and the second carrier is currently utilizing less power than the first carrier, and a fourth value corresponding to an indication that the UE will benefit from being permitted to transmit at a data rate higher than the permissible data rate, and an increased data rate on both of the two carriers is requested.

18. The method of claim 15, wherein the two-bit number comprises a first bit for indicating whether the UE will benefit from being permitted to transmit at a data rate higher than the permissible data rate on at least one of the plurality of carriers, and a second bit for indicating which of the two carriers is preferable for a higher grant.

19. A method of communication in a wireless network, comprising:
   providing an indicator on each one of a plurality of uplink carriers, wherein the indicator on each one of the plurality of uplink carriers consists of one bit relating to a status of uplink transmission resources on the corresponding uplink carrier, and wherein a value for the indicator is set based on a power split between the plurality of uplink carriers determined during an enhanced transport format combination (E-TFC) selection procedure, wherein the power split between the plurality of uplink carriers is reused to determine whether each of the carriers can support a higher data rate.

20. The method of claim 19, wherein the indicator is provided during each transmission on a dedicated uplink channel for each of the plurality of uplink carriers.

21. The method of claim 19, wherein the uplink transmission resources are dynamically allocated between the plurality of uplink carriers.

22. The method of claim 19, wherein the plurality of uplink carriers comprises a first carrier and a second carrier, the method further comprising:
   determining the status of the uplink transmission resources on the first carrier by determining whether a user equipment configured to provide the plurality of uplink carriers will benefit from being permitted to transmit at a data rate higher than a first permissible data rate on the first carrier; and
   determining the status of the uplink transmission resources on the second carrier by determining whether the user equipment will benefit from being permitted to transmit at a data rate higher than a second permissible data rate on the second carrier.

23. The method of claim 22,
   wherein the determining whether the user equipment will benefit from being permitted to transmit at a higher data rate than the first permissible data rate on the first carrier is based on at least one of channel conditions of the first carrier or a first buffer length for data to be transmitted on the first carrier; and
   wherein the determining whether the user equipment will benefit from being permitted to transmit at a higher data rate than the second permissible data rate on the second carrier is based on at least one of channel conditions of the second carrier or a second buffer length for data to be transmitted on the second carrier.

24. The method of claim 23, wherein the permissible data rate for each of the first carrier and the second carrier is determined at least in part in accordance with a respective serving grant for the first carrier and the second carrier.

25. The method of claim 24, wherein the determining whether the user equipment will benefit from being permitted to transmit at a higher data rate than the first permissible data rate on the first carrier comprises:
   determining whether the user equipment is transmitting at the first permissible data rate on the first carrier;
   determining whether the user equipment has sufficient power available to increase to the higher data rate on the first carrier; and
   determining whether a delay in transmitting a buffer status of respective buffers corresponding to the first carrier is greater than a first threshold.

26. The method of claim 25, wherein the determining whether the user equipment will benefit from being permitted to transmit at a higher data rate than the second permissible data rate on the second carrier comprises:
   determining whether the user equipment is transmitting at the second permissible data rate on the first carrier;
   determining whether the user equipment has sufficient power available to increase to the higher data rate on the second carrier; and
   determining whether a delay in transmitting a buffer status of respective buffers corresponding to the second carrier is greater than a second threshold.

27. The method of claim 26, wherein the determining whether the user equipment has sufficient power available to increase to the higher data rate on the respective first and second carriers comprises:
   identifying a transport format combination comprising a transport block size greater than a transport block size threshold; and
   determining whether the identified transport format combination is blocked.

28. The method of claim 27, wherein the determining whether the identified transport format combination is blocked comprises utilizing a power offset corresponding to the identified transport format combination selected in an E-TFC selection procedure.

29. The method of claim 27, wherein the determining whether the identified transport format combination is blocked comprises utilizing the power split determined during an E-TFC selection procedure.

30. An apparatus for communication in a wireless network, comprising:
   means for transmitting a plurality of uplink carriers from a user equipment; and
   means for providing an indicator on each one of the plurality of uplink carriers, wherein the indicator on each one of the plurality of uplink carriers consists of one bit relating to a status of uplink transmission resources on the corresponding uplink carrier, and wherein a value for the indicator is set based on a power split between the plurality of uplink carriers determined during an enhanced transport format combination (E-TFC) selection procedure, wherein the power split between the plurality of uplink carriers is reused to determine whether each of the carriers can support a higher data rate.

31. The apparatus of claim 30, wherein the indicator is provided during each transmission on a dedicated uplink channel for each of the plurality of uplink carriers.

32. The apparatus of claim 30, wherein the uplink transmission resources are dynamically allocated between the plurality of uplink carriers.

33. The apparatus of claim 30, wherein the plurality of uplink carriers comprises a first carrier and a second carrier, the apparatus further comprising:
   means for determining the status of the uplink transmission resources on the first carrier by determining whether the user equipment will benefit from being permitted to transmit at a data rate higher than a first permissible data rate on the first carrier; and means for determining the status of the uplink transmission resources on the second carrier by determining whether the user equipment will benefit from being permitted to transmit at a data rate higher than a second permissible data rate on the second carrier.

34. The apparatus of claim 33, wherein the means for determining whether the user equipment will benefit from being permitted to transmit at a higher data rate than the first permissible data rate on the first carrier is configured to make the determination based on at least one of channel conditions of the first carrier or a first buffer length for data to be transmitted on the first carrier; and wherein the means for determining whether the user equipment will benefit from being permitted to transmit at a higher data rate than the second permissible data rate on the second carrier is configured to make the determination based on at least one of channel conditions of the second carrier or a second buffer length for data to be transmitted on the second carrier.

35. The apparatus of claim 34, wherein the permissible data rate for each of the first carrier and the second carrier is determined at least in part in accordance with a respective serving grant for the first carrier and the second carrier.

36. The apparatus of claim 35, wherein the means for determining whether the user equipment will benefit from being permitted to transmit at a higher data rate than the first permissible data rate on the first carrier comprises:

means for determining whether the user equipment is transmitting at the first permissible data rate on the first carrier;

means for determining whether the user equipment has sufficient power available to increase to the higher data rate on the first carrier; and means for determining whether a delay in transmitting a buffer status of respective buffers corresponding to the first carrier is greater than a first threshold.

37. The apparatus of claim 36, wherein the means for determining whether the user equipment will benefit from being permitted to transmit at a higher data rate than the second permissible data rate on the second carrier comprises:

means for determining whether the user equipment is transmitting at the second permissible data rate on the first carrier;

means for determining whether the user equipment has sufficient power available to increase to the higher data rate on the second carrier; and means for determining whether a delay in transmitting a buffer status of respective buffers corresponding to the second carrier is greater than a second threshold.

38. The apparatus of claim 37, wherein the means for determining whether the user equipment has sufficient power available to increase to the higher data rate on the respective first and second carriers comprises:

means for identifying a transport format combination comprising a transport block size greater than a transport block size threshold; and means for determining whether the identified transport format combination is blocked.

39. The apparatus of claim 38, wherein the determining whether the identified transport format combination is blocked comprises utilizing a power offset corresponding to the identified transport format combination selected in an E-TFC selection procedure.

40. The apparatus of claim 38, wherein the means for determining whether the identified transport format combination is blocked comprises means for utilizing the power split determined during an E-TFC selection procedure.

41. A non-transitory computer-readable medium comprising code for:

providing an indicator on each one of a plurality of uplink carriers, wherein the indicator on each one of the plurality of uplink carriers consists of one bit relating to a status of uplink transmission resources on the corresponding uplink carrier, and wherein a value for the indicator is set based on a power split between the plurality of uplink carriers determined during an enhanced transport format combination (E-TFC) selection procedure, wherein the power split between the plurality of uplink carriers is reused to determine whether each of the carriers can support a higher data rate.

42. The non-transitory computer-readable medium of claim 41, wherein the indicator is provided during each transmission on a dedicated uplink channel for each of the plurality of uplink carriers.

43. The non-transitory computer-readable medium of claim 41, wherein the uplink transmission resources are dynamically allocated between the plurality of uplink carriers.

44. The non-transitory computer-readable medium of claim 41, wherein the plurality of uplink carriers comprises a first carrier and a second carrier, the non-transitory computer-readable medium further comprising code for:

determining the status of the uplink transmission resources on the first carrier by determining whether a user equipment configured to provide the plurality of uplink carriers will benefit from being permitted to transmit at a data rate higher than a first permissible data rate on the first carrier; and determining the status of the uplink transmission resources on the second carrier by determining whether the user equipment will benefit from being permitted to transmit at a data rate higher than a second permissible data rate on the second carrier.

45. The non-transitory computer-readable medium of claim 44, wherein the code for determining whether the user equipment will benefit from being permitted to transmit at a higher data rate than the first permissible data rate on the first carrier is configured to make the determination based on at least one of channel conditions of the first carrier or a first buffer length for data to be transmitted on the first carrier; and wherein the code for determining whether the user equipment will benefit from being permitted to transmit at a higher data rate than the second permissible data rate on the second carrier is configured to make the determination based on at least one of channel conditions of the second carrier or a second buffer length for data to be transmitted on the second carrier.

46. The non-transitory computer-readable medium of claim 45, wherein the permissible data rate for each of the first carrier and the second carrier is determined at least in part in accordance with a respective serving grant for the first carrier and the second carrier.

47. The non-transitory computer-readable medium of claim 46, wherein the code for determining whether the user equipment will benefit from being permitted to transmit at a higher data rate than the first permissible data rate on the first carrier comprises code for:

determining whether the user equipment is transmitting at the first permissible data rate on the first carrier;

determining whether the user equipment has sufficient power available to increase to the higher data rate on the first carrier; and determining whether a delay in transmitting a buffer status of respective buffers corresponding to the first carrier is greater than a first threshold.

48. The non-transitory computer-readable medium of claim 47, wherein the code for determining whether the user equipment will benefit from being permitted to transmit at a higher data rate than the second permissible data rate on the second carrier comprises code for:

determining whether the user equipment is transmitting at the second permissible data rate on the first carrier;

determining whether the user equipment has sufficient power available to increase to the higher data rate on the second carrier; and determining whether a delay in transmitting a buffer status of respective buffers corresponding to the second carrier is greater than a second threshold.

49. The non-transitory computer-readable medium of claim 48, wherein the code for determining whether the user equipment has sufficient power available to increase to the higher data rate on the respective first and second carriers comprises code for:

identifying a transport format combination comprising a transport block size greater than a transport block size threshold; and determining whether the identified transport format combination is blocked.

50. The non-transitory computer-readable medium of claim 49, wherein the code for determining whether the identified transport format combination is blocked comprises code for utilizing a power offset corresponding to the identified transport format combination selected in an E-TFC selection procedure.

51. The non-transitory computer-readable medium of claim 49, wherein the code for determining whether the identified transport format combination is blocked comprises code for utilizing the power split determined during an E-TFC selection procedure.

52. An apparatus for wireless communication, comprising:
at least one processor; and
a memory coupled to the at least one processor,
wherein the at least one processor is configured to:
provide an indicator on each one of a plurality of uplink carriers, wherein the indicator on each one of the plurality of uplink carriers consists of one bit relating to a status of uplink transmission resources on the corresponding uplink carrier, and wherein a value for the indicator is set based on a power split between the plurality of uplink carriers determined during an enhanced transport format combination (E-TFC) selection procedure, wherein the power split between the plurality of uplink carriers is reused to determine whether each of the carriers can support a higher data rate.

53. The apparatus of claim 52, wherein the indicator is provided during each transmission on a dedicated uplink channel for each of the plurality of uplink carriers.

54. The apparatus of claim 52, wherein the uplink transmission resources are dynamically allocated between the plurality of uplink carriers.

55. The apparatus of claim 52, wherein the plurality of uplink carriers comprises a first carrier and a second carrier, and wherein the at least one processor is further configured to:

determine the status of the uplink transmission resources on the first carrier by determining whether a user equipment configured to provide the plurality of uplink carriers will benefit from being permitted to transmit at a data rate higher than a first permissible data rate on the first carrier; and determine the status of the uplink transmission resources on the second carrier by determining whether the user equipment will benefit from being permitted to transmit at a data rate higher than a second permissible data rate on the second carrier.

56. The apparatus of claim 55,
wherein the determining whether the user equipment will benefit from being permitted to transmit at a higher data rate than the first permissible data rate on the first carrier is based on at least one of channel conditions of the first carrier or a first buffer length for data to be transmitted on the first carrier; and wherein the determining whether the user equipment will benefit from being permitted to transmit at a higher data rate than the second permissible data rate on the second carrier is based on at least one of channel conditions of the second carrier or a second buffer length for data to be transmitted on the second carrier.

57. The apparatus of claim 56, wherein the permissible data rate for each of the first carrier and the second carrier is determined at least in part in accordance with a respective serving grant for the first carrier and the second carrier.

58. The apparatus of claim 57, wherein the processor, configured to determine whether the user equipment will benefit from being permitted to transmit at a higher data rate than the first permissible data rate on the first carrier, is further configured to:

determine whether the user equipment is transmitting at the first permissible data rate on the first carrier;

determine whether the user equipment has sufficient power available to increase to the higher data rate on the first carrier; and determine whether a delay in transmitting a buffer status of respective buffers corresponding to the first carrier is greater than a first threshold.

59. The apparatus of claim 58, wherein the processor, configured to determine whether the user equipment will benefit from being permitted to transmit at a higher data rate than the second permissible data rate on the second carrier, is further configured to:

determine whether the user equipment is transmitting at the second permissible data rate on the first carrier;

determine whether the user equipment has sufficient power available to increase to the higher data rate on the second carrier; and determine whether a delay in transmitting a buffer status of respective buffers corresponding to the second carrier is greater than a second threshold.

60. The apparatus of claim 59, wherein the processor, configured to determine whether the user equipment has sufficient power available to increase to the higher data rate on the respective first and second carriers, is further configured to:

identify a transport format combination comprising a transport block size greater than a transport block size threshold; and determine whether the identified transport format combination is blocked.

61. The apparatus of claim 60, wherein the determining whether the identified transport format combination is blocked comprises utilizing a power offset corresponding to the identified transport format combination selected in an E-TFC selection procedure.

62. The apparatus of claim 60, wherein the determining whether the identified transport format combination is blocked comprises utilizing the power split determined during an E-TFC selection procedure.

* * * * *